US012738765B2

(12) United States Patent
Yang et al.

(10) Patent No.: US 12,738,765 B2
(45) Date of Patent: Sep. 15, 2026

(54) METHOD AND SYSTEM FOR OPTIMIZATION TO NON-CONTACT MICRO INTELLIGENT SENSING IN SECONDARY DC LOOP POTENTIAL

(71) Applicant: Yunnan Power Grid Co., Ltd, Kunming (CN)

(72) Inventors: Yuanhang Yang, Kunming City (CN); Benyu Li, Kunming City (CN); Dezhi Kong, Kunming City (CN); Qiaowei Yang, Kunming City (CN); Jing Chen, Kunming City (CN); Jiong Chen, Kunming City (CN); Hengchu Shi, Kunming City (CN); Hao You, Kunming City (CN); Lidan Peng, Kunming City (CN); Shuying Pang, Kunming City (CN); Yigong Xie, Kunming City (CN); Ming Zhao, Kunming City (CN); Gang Chen, Kunming City (CN); Yunkun Deng, Kunming City (CN); Zaihe Yang, Kunming City (CN); Zongguan Shao, Kunming City (CN)

( * ) Notice: Subject to any disclaimer, the term of this patent is extended or adjusted under 35 U.S.C. 154(b) by 367 days.

(21) Appl. No.: 18/534,769

(22) Filed: Dec. 11, 2023

(65) Prior Publication Data

US 2025/0183707 A1 Jun. 5, 2025

(30) Foreign Application Priority Data

Dec. 1, 2023 (CN) ........................ 202311635812.9

(51) Int. Cl.
*H02J 13/12* (2026.01)

(52) U.S. Cl.
CPC .................................. *H02J 13/12* (2026.01)

(58) Field of Classification Search
CPC ... G01R 1/18; G01R 1/30; G01R 1/44; G01R 19/0084; G01R 15/16; H02J 13/12; G01D 3/028
See application file for complete search history.

(56) References Cited

U.S. PATENT DOCUMENTS 4,797,620 A * 1/1989 Williams ............ G01R 15/165 324/458
5,270,660 A * 12/1993 Werner, Jr. ............ G01R 29/12 324/458

(Continued)

*Primary Examiner* — Nicholas Klicos

(57) ABSTRACT

A method and a system for optimization to non-contact micro intelligent sensing in secondary DC loop potential are provided, including demodulating a weak AC current modulation signal through a demodulation circuit and amplifying the weak AC current modulation signal; amplifying the weak AC current modulation signal to output a stable and amplified measurable potential signal; processing the potential signal for noise to obtain a stable DC potential signal; inputting the DC potential signal to a comprehensive computing module for analysis and processing; using micro sensors to measure information. The measured potential results are input to the comprehensive computing module to analyze and correct, and the measurement results are output to the communication module for external output. The equipment is packaged to form a potential collection "probe" and a potential measurement "unit". The potential measurement "unit" supports multiple potential collection "probes" for accessing.

9 Claims, 3 Drawing Sheets

(56) References Cited

U.S. PATENT DOCUMENTS

| | | | | |
|---|---|---|---|---|
| 2008/0122546 | A1* | 5/2008 | Shiramizu | H03L 7/18<br>331/34 |
| 2015/0335260 | A1* | 11/2015 | Kim | A61B 5/024<br>600/513 |
| 2018/0149679 | A1* | 5/2018 | Hernandez | G01N 22/00 |
| 2018/0375377 | A1* | 12/2018 | Ellis | H02J 50/10 |
| 2021/0247787 | A1* | 8/2021 | Gray | G01D 5/24 |
| 2025/0102550 | A1* | 3/2025 | Kawahara | G01R 27/08 |

* cited by examiner demodulating a weak AC current modulation signal through a demodulation circuit, amplifying the weak AC current modulation signal by a three-op-amp differential amplifier to output a stable and amplified measurable potential signal, and passing the potential signal through a phase-sensitive detector to eliminate noise signals at non-driving frequencies, wherein the noise-removed potential signal is filtered out by a low-pass filter to filter out the AC signal to obtain a stable DC potential signal

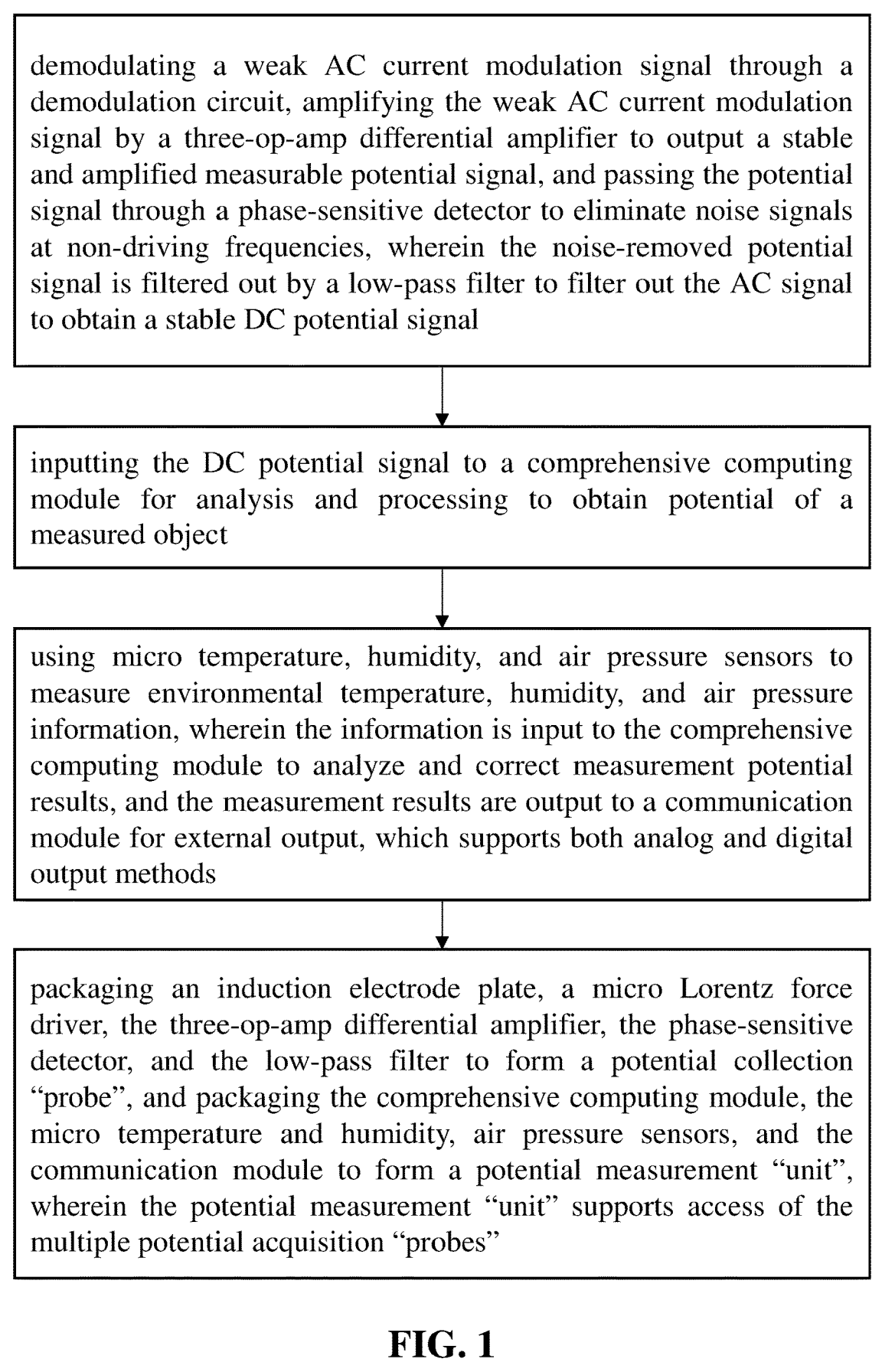

↓ inputting the DC potential signal to a comprehensive computing module for analysis and processing to obtain potential of a measured object

↓ using micro temperature, humidity, and air pressure sensors to measure environmental temperature, humidity, and air pressure information, wherein the information is input to the comprehensive computing module to analyze and correct measurement potential results, and the measurement results are output to a communication module for external output, which supports both analog and digital output methods

↓ packaging an induction electrode plate, a micro Lorentz force driver, the three-op-amp differential amplifier, the phase-sensitive detector, and the low-pass filter to form a potential collection "probe", and packaging the comprehensive computing module, the micro temperature and humidity, air pressure sensors, and the communication module to form a potential measurement "unit", wherein the potential measurement "unit" supports access of the multiple potential acquisition "probes"

FIG. 1

METHOD AND SYSTEM FOR OPTIMIZATION TO NON-CONTACT MICRO INTELLIGENT SENSING IN SECONDARY DC LOOP POTENTIAL

TECHNICAL FIELD

The present invention relates to the technical field of potential measurement, in particular to a method and a system for optimization to non-contact micro intelligent sensing in secondary dc loop potential.

BACKGROUND

The secondary system in the power system plant station plays a role in monitoring, controlling, regulating and protecting the working conditions of the primary equipment. The secondary DC loop is an important part of the secondary system and serves as an information "bridge" connecting the primary and secondary equipment, undertaking the task of transmitting secondary equipment monitoring, control, regulation and protection signals and instructions. When defects such as virtual connections, disconnections or misconnections occur in the secondary DC loop, corresponding signals and instructions are not transmitted correctly and reliably, resulting in secondary equipment such as measurement and control, relay protection, safety automatic devices and circuit breakers malfunctioning or rejecting. It may cause serious damage to the primary equipment, or even cause extremely serious consequences such as personal accidents and large-scale power outages in the power system. The potential of each node of the secondary DC loop is a direct representation of the loop's operating status and is the basic basis for loop operating status monitoring, fault, and defect handling. Measuring the potential of the secondary DC loop is an important way to realize virtual connections, disconnections and misconnections in the secondary DC loop, as well as necessary means of early warning and analysis and handling caused by defects such as connection. So far, the potential in the secondary DC loop is mainly measured using a multimeter. This method requires good electrical contact between the measuring element (meter lead) and the measured location. During the measurement process, it is prone to DC short circuits, grounding, and electric shock caused by meter position errors, accidental personnel contact, parasitic loops, etc. Additionally, real-time monitoring is inconvenient. Therefore, achieving secondary circuit DC potential measurement through a non-contact method is an effective solution.

With the construction and application of high-voltage direct current transmission projects, technical researches and engineering practices of non-contact measurement of DC potential have gradually attracted attention. At present, there are three main methods for non-contact measurement for DC potential: one is the impulse current method (which is also called the probe method). The electric field strength is obtained by using the impulse current generated instantaneously by placing a measurement probe in a strong DC electric field. In 2002, Harland C J and other scholars published a paper in the journal paper "Applied Physics Letters" which introduces a specific measurement method. The measurement results of this method are easily affected by electrostatic interference and the error performance is unstable, so it has been rarely used in engineering practice. The second is the photoelectric effect method. The changes in light transmission characteristics of special crystal materials in different electric fields are used to measure the intensity of the electric field, in which the common approaches include the Pockel effect and the magneto-optical Cole effect. Typically, in 2007, Cecelja F and other scholars published relevant research results in the journal paper "Measurement". This method has expensive materials, which is susceptible to external temperature or vibration interference, and has poor long-term operation stability and reliability. The applications and reports of the above two methods mostly appeared in the early stages of the development of high-voltage DC transmission, and are rarely used in the current stage. The third is the variable capacitance method. This method uses a special processing method to generate dynamically changing capacitance in a static DC electric field. By measuring the changing capacitance or measuring the current generated by the capacitance change, the DC electric field intensity is measured, and then the DC potential is measured eventually. Common processing methods that produce changing capacitance include field-grinding sensors, field-controlled effect sensors of varactor diodes, inverse piezoelectric effect sensors of piezoelectric devices, etc. Such the method can achieve higher sensitivity measurement, the smaller sensor, stronger anti-interference ability, more economical, and good application prospects.

The patent application number 202310430039.6 discloses a method of measuring transmission line voltage using a MEMS voltage sensor. This method uses a comb-shaped drive structure to drive the shielding electrode to vibrate laterally, changing the projection area with the sensing electrode, causing the surface charge of the sensing electrode to change and then generating induced current to achieve electrostatic measurement. However, the comb-shaped drive structure used in this method is easy to wear and difficult to comply with the requirements for long-term (for more than 12 years) continuous use. If the way of changing the shielding area to obtain changing capacitance is taken, the measurement accuracy is not as good as expected under weak field strength conditions. Moreover, using a stainless steel box or other components for encapsulating measurement, processing, communicating will cause the sensor to be overweight and too large in size. Also, using simply packaging to solve problems such as dust and humidity can only solve the problem of sensitive chips being affected by the environment, but some electric fields are still exposed in the environment, which may result in poor cooling performance.

The patent application number 202210425080.X discloses a non-contact measuring device and method for DC voltage of wires. This method realizes non-contact measurement of DC voltage of wires based on the inverse piezoelectric effect of piezoelectric devices. It is expected to achieve the purpose of reducing component power consumption, reducing volume and improving accuracy by eliminating the mechanical vibration structure of measurement components. However, equipment volume and accuracy are not clearly described in the application.

The above method does not deeply consider the issues of anti-interference in complex electromagnetic environments, miniaturization, lightweight, and accurate measurement of weak electric fields. In high-voltage primary measurement scenarios, when the above performance requirements are not high, it may have certain application prospects. However, it is difficult to apply such the method to secondary DC loop potential measurement scenarios.

Research on non-contact intelligent measurement technology suitable for secondary DC loop potential has just emerged. The patent application number 202211136966.9 discloses a hard plate non-contact DC electric field measurement method and device. This method uses the change of barrier capacitance of the varactor diode as the characters to measure the surface electric field of the secondary circuit lead, which can more accurately measure the terminal potential of the pressure plate of the protection screen cabinet. Based on the measured potential, such the method can solve the problem of identifying the status of the pressure plate of the protection screen cabinet, having strong engineering guidance value for measuring secondary DC loop potential.

However, the secondary DC loop is distributed in a widely range (e.g., which is distributed at protective screens, terminal boxes, control cabinets, etc.). There are parts in the protection cabin and parts in the outdoor high-voltage switch field, which means the environment may be complex and the working conditions are harsh. Usually, the installation space of the measuring device is narrow, the operating environment is seriously affected by the coupling of AC and DC electromagnetic fields, and the temperature, humidity and air pressure change greatly. In engineering applications, the measuring device is also required to have high measurement accuracy and long-term stable operation performance, and therefore it is necessary to solve the issues as follows:

(1) high measurement accuracy.
(2) miniaturization and lightweight.
(3) strong anti-electromagnetic interference ability.
(4) broad-spectrum adaptability to temperature, humidity, and air pressure. Generally, the indoor operating environment is good, which means the temperature, humidity, and air pressure do not fluctuate in a wide range (e.g., when measuring the secondary DC loop potential is performed inside the protective screen cabinet). However, the temperature, humidity and air pressure in the terminal box and control cabinet of the outdoor switchyard would change greatly. The above-mentioned climate parameters will significantly affect the air-relative dielectric coefficient, thereby affecting the capacitance measurement as well. The measuring components are required to have temperature, humidity and air pressure resistance to match the broad-spectrum adaptability.

The above is made for complying with the requirements of stable operation for a long time. Measuring components collect the potential of the secondary circuit in real time to realize real-time monitoring of the status of the secondary circuit, which should have the ability to operate stably for a long time to avoid an increase in equipment operation and maintenance workload caused by high failure damage rates.

SUMMARY OF INVENTION

In view of the above, the present invention is proposed for those existing problems.

Therefore, a method for optimization to non-contact micro intelligent sensing in secondary DC loop potential is provided by the present invention to solve the problem in traditional technology that the electric field strength of the measured object is weak and high-precision measurement is difficult.

In order to solve the above technical problems, the present invention provides the following technical solution: a method for optimization to non-contact micro intelligent sensing in secondary DC loop potential, including:

demodulating a weak AC current modulation signal through a demodulation circuit, and amplifying the weak AC current modulation signal by a three-op-amp differential amplifier to output a stable and amplified measurable potential signal, passing the potential signal through a phase-sensitive detector to eliminate noise signals at non-driving frequencies, in which the noise-removed potential signal is filtered out by a low-pass filter to filter out the AC signal to obtain a stable DC potential signal; the DC voltage signal is input to a comprehensive computing module for analysis and processing to obtain potential of a measured object; micro temperature, humidity, and air pressure sensors are used to measure environmental temperature, humidity, and air pressure information, in which the information is input to the comprehensive computing module to analyze and correct measurement potential results, and the measurement results are output to a communication module for external output, which supports both analog and digital output methods; an induction electrode plate, a micro Lorentz force driver, the three-op-amp differential amplifier, the phase-sensitive detector, and the low-pass filter are packaged to form a potential collection "probe", and the comprehensive computing module, the micro temperature and humidity, air pressure sensors, and the communication module are packaged to form a potential measurement "unit", in which the potential measurement "unit" supports access of the multiple potential acquisition "probes".

As a preferred solution of the method for optimization to non-contact micro intelligent sensing in secondary DC loop potential according to the present invention, in which demodulating a weak AC current modulation signal through a demodulation circuit includes: installing a smart sensor on the secondary DC loop to be measured, in which, based on the modulation principle of a vibration capacitor, the capacitance of the induction electrode plate and the charged object under testing generates an alternating capacitance driven by the Lorentz force driver, causing charges on the induction electrode plate with periodically changing so as to collect the AC current signal i(t) on the induction electrode plate.

Through the three-op-amp differential amplifier, the AC current signal is turned into an amplified AC potential signal, and the AC potential signal $u_0(t)$ is obtained.

After the AC potential signal passes through data processing by the phase-sensitive detector and the low-pass filter, a real-time potential signal $u_0$ of the secondary DC loop to be measured is output.

By correcting the air-relative dielectric coefficient that affects capacitance measurement, the effects of temperature, humidity, and air pressure to the measurement signal are resolved, and the corrected DC potential signal $u_1$ is obtained.

According to the output potential $u_1$ of the smart sensor in the potential measurement scenario, in combination with a fitting formula $u_2=ku_1$ to calibrate the actual output potential of the smart sensor, the output potential of the measurement unit of the smart sensor after potential calibration is the secondary DC loop potential to be measured.

As a preferred solution of the method for optimization to non-contact micro intelligent sensing in secondary DC loop potential according to the present invention, in which the demodulating the weak AC current modulation signal includes: based on the modulation principle of the vibration capacitor, the back-end electrical signal detection circuit is used to amplify the electrical signal to produce a potential signal output, and the distance between the induction electrode plate and the secondary DC loop to be measured is:

$$d = d_0 + \Delta d \sin(\omega t)$$

where, $d_0$ is the distance between the vibrating plate and the secondary DC loop to be measured when it is in the equilibrium position, $\Delta d$ is the vibration amplitude of the induction electrode plate, when the driving structure based on Lorentz force is selected, $d_0$ and $\Delta d$ can be obtained by measurement, and $\omega$ is the angular frequency of vibration, $\omega=2\pi f$, f is the frequency of AC current passed into the vibrating cantilever beam of the driving structure, and t is time.

Then the capacitance on the vibrating plate is:

$$C = \frac{\varepsilon S}{d_0 + \Delta d \sin(\omega t)}$$

where, $\varepsilon$ is the dielectric coefficient of air, and S is the area of the vibrating plate.

Then the induced current on the induction electrode plate is:

$$i(t) = -U\varepsilon S \times \frac{d\omega\cos(\omega t)}{[d_0 + d\sin(\omega t)]^2}$$

where U is the potential difference between the induction electrode plate and the surface of the secondary DC loop to be measured.

As a preferred solution of the method for optimization to non-contact micro intelligent sensing in secondary DC loop potential according to the present invention, in which the demodulating includes that the AC current signal output by the vibration capacitor of a modulation circuit needs to be converted into an output potential through an operational amplifier, the output potential is:

$$u_0(t) = -i(t) \times R \times \left(1 + \frac{2R_2}{R_1}\right) \times \frac{R_6}{R_4}$$

where, i(t) is the input AC current, R is the input resistance, and $R_1$, $R_2$, $R_4$, $R_6$ are the feedback resistances. The input resistance R is set as 10 MΩ.

As a preferred solution of the method for optimization to non-contact micro intelligent sensing in secondary DC loop potential according to the present invention, in which the demodulating further includes marking the measured signal $u_0$ (t) and the reference signal $u_1$ (t) as:

$$u_0(t) = U_0 \sin(\omega t + \phi)$$

$$u_1(t) = U_1 \sin(\omega t + \delta)$$

where, $U_0$ and $U_1$ are the amplitudes of the measured signal and the reference signal, respectively, $\phi$ and $\delta$ are the phases of the measured signal and the reference signal, respectively, $\omega$ is the angular frequency, and the reference signal $u_1$ (t) adopts the driving power of the micro-Lorentz force driver.

After the measured signal and the reference signal are input into the multiplier simultaneously and multiplied, the demodulated output response signal is:

$$u_{out} = \frac{1}{2}U_0U_1\cos(\phi - \delta) - \frac{1}{2}U_0U_1\cos(2\omega t + \phi + \delta) + U_1\sin(\omega t + \delta)$$

where, $U_0$ and $U_1$ are the amplitudes of the measured signal and the reference signal, respectively, $\phi$ and $\delta$ are the phases of the measured signal and the reference signal, respectively, $\omega$ is the angular frequency.

The demodulated output response signal is then filtered by the low-pass filter, and the high-frequency AC signal in the formula is removed; and accordingly, the final potential output by the signal demodulation circuit is:

$$u_{out} = \frac{1}{2}U_0U_1\cos(\phi - \delta)$$

where, the meaning of each physical symbol is the same as the definition of the previous formula.

As a preferred solution of the method for optimization to non-contact micro intelligent sensing in secondary DC loop potential according to the present invention, the analysis by the comprehensive computing module includes: establishing a relationship among air dielectric coefficient, air temperature, humidity, and atmospheric pressure, as shown below:

$$\varepsilon_r = \frac{\frac{2PK}{R_g(273+t)}\left[1 - \frac{R_g\delta p_s}{P}\left(\frac{1}{R_g} - \frac{1}{R_s}\right)\right] + 1}{1 - \frac{PK}{R_g(273+t)}\left[1 - \frac{R_g\delta p_s}{P}\left(\frac{1}{R_g} - \frac{1}{R_s}\right)\right]}$$

In the formula, P is the atmospheric pressure, $\delta$ is the relative humidity of the air, t is the temperature in degrees Celsius, $\delta$ and t are measured by a micro temperature and humidity sensor, P is measured by a micro air pressure sensor, K is the proportionality constant, $R_g$ is the dry air gas constant, $R_s$ is the water vapor gas constant, $p_s$ is the saturated water vapor pressure corresponding to the ambient temperature.

The corrected output potential is:

$$u_1 = u_{out} \times \frac{\frac{2PK}{R_g(273+t)}\left[1 - \frac{R_g\delta p_s}{P}\left(\frac{1}{R_g} - \frac{1}{R_s}\right)\right] + 1}{1 - \frac{PK}{R_g(273+t)}\left[1 - \frac{R_g\delta p_s}{P}\left(\frac{1}{R_g} - \frac{1}{R_s}\right)\right]}$$

where, $u_{out}$ is the output potential after passing through the A/D converter, P is the atmospheric pressure, $\delta$ is the relative humidity of the air, t is the temperature in degrees Celsius, K is the proportionality constant, $R_g$ is the dry air gas constant, $R_s$ is the water vapor gas constant, $p_s$ is the saturated water vapor pressure corresponding to the ambient temperature.

As a preferred solution of the method for optimization to non-contact micro intelligent sensing in secondary DC loop potential according to the present invention, the measurement potential results include that the unit area weight of the sandwich structure of the measuring device shell material is:

$$W = \rho_1 d_1 + \rho_2 d_2 + \rho_3 d_3$$

In the formula, $\rho_1$, $\rho_2$, $\rho_3$ are the material densities of the inner panel, sandwich layer, and outer panel, respectively, and $d_1$, $d_2$, $d_3$ are the thicknesses of the inner panel, sandwich layer, and outer panel, respectively.

The calculation formula for the electromagnetic shielding effectiveness of the measuring device shell material is:

$$SE = 20\,lg\left(1 + \frac{1}{2}\sqrt{\frac{\mu_0}{\varepsilon_0}} \times \sigma \times c\right)$$

In the formula, $\mu_0$ is the vacuum magnetic permeability, $\varepsilon_0$ is the vacuum conductivity, $\sigma$ is the volume conductivity of the material, $d_1$, $d_2$, $d_3$ are the thicknesses of the inner panel, sandwich layer, and outer panel, respectively, and c is the thickness of the material as $c=d_1+d_2+d_3$.

The Lagrangian multiplier method is used to construct a Lagrangian function with the thicknesses of the inner panel, the core layer, and the outer panel as variables, seeking to minimize the shell weight W of the measurement device under constraints with strength, stiffness, and electromagnetic shielding effectiveness, in which the Lagrangian function is formulated as follows:

$$L(d_1, d_2, d_3, \lambda_1, \lambda_2, \lambda_3) = \rho_1 d_1 + \rho_2 d_2 + \rho_3 d_3 - \lambda_1\left[\frac{1}{4}(E_{f1}d_1 + E_{f3}d_3) \times d_2^2 - D_1\right] - \lambda_2\left[\frac{1}{4}(G_{f1}d_1 + G_{f3}d_3) \times d_2^2 - K_1\right] - \lambda_3\left[20\,lg\left(1 + \frac{1}{2}\sqrt{\frac{\mu_0}{\varepsilon_0}} \times \sigma \times d\right) - SE_1\right]$$

where, $\lambda_1$, $\lambda_2$, $\lambda_3$ are the Lagrange multipliers, $E_{f1}$ and $E_{f3}$ are the elastic modulus parameters of the inner panel and outer panel material, $G_{f1}$ and $G_{f1}$ are the shear modulus parameters, $D_1$ is the initial parameter of the shell bending stiffness, $K_1$ is the initial parameter of the shell torsional stiffness, $SE_1$ is the minimum material electromagnetic shielding effectiveness, which is taken at 58 dB.

Another object of the present invention is to provide a system for optimization to non-contact micro intelligent sensing in secondary DC loop potential, which can use the method for optimization to non-contact micro intelligent sensing in secondary DC loop potential to solve problems that cannot be solved in existing technologies.

As a preferred solution of the system for optimization to non-contact micro intelligent sensing in secondary DC loop potential according to the present invention, the system includes an instruction collection unit for collecting instructions issued by the system; a system logic unit for carrying system calibration rules and system control logic; a data processing unit for processing data in instructions or system programs; a data storage unit used to store instructions and operations in the collection, calculation and driving stages; a data main-console used to track the entire process of program control.

A computer device includes a memory and a processor. The memory stores a computer program, characterized in that when the processor executes the computer program, it implements the steps of the method for optimization to non-contact micro intelligent sensing in secondary DC loop potential as afore-described.

A computer-readable storage medium has a computer program stored thereon, characterized in that when the computer program is executed by a processor, the steps of the method for optimization to non-contact micro intelligent sensing in secondary DC loop potential as afore-described are implemented.

Beneficial effects of the present invention: the method of the present invention is based on the electromagnetic driven vibration capacitance measuring device based on the Lorentz force, having the characteristics of fast response, low driving potential, large driving force and driving displacement, which can eliminate the mechanical friction existing in the traditional driving structure. Therefore, during operation for a long time, the power consumption of the magnetic drive structure measuring device based on Lorentz force is lower than that of other drive methods, and its stability is higher, which also reduces operation and maintenance costs. Based on the modulation principle of the vibration capacitor, as considering the influence of temperature, humidity, and air pressure on the measurement signal, a calculation model for temperature, humidity, air pressure, and air-relative dielectric coefficient is established. Further, by correcting the air-relative dielectric coefficient that affects capacitance measurement, the measuring element can achieve broad-spectrum adaptability to temperature, humidity, and air pressure. Based on the principle of electromagnetic shielding, a composite material with high shielding efficiency is used as a shielding layer to encapsulate the measuring element and the low-voltage secondary DC loop to be measured. These components are in the same electric field space and the shielding layer is grounded, thereby effectively suppressing and weakening long-term interference from external electromagnetic fields and adjacent charged intervals, and improving measurement accuracy. The operational amplifier used in the signal demodulation circuit is a three-op-amp differential amplifier, which has the characteristics of high gain, high input impedance and high common-mode rejection ratio, so that the measurement device has high accuracy and the measurement loop has strong anti-interference ability. The signal demodulation circuit adopts phase-sensitive detection technology, which has outstanding advantages such as fast response speed, good frequency response characteristics, strong anti-electromagnetic interference ability, high measurement accuracy, and high safety of use. The output potential is calibrated using the linear fitting results of the test data, so that the final output potential of the smart sensor is the potential of the secondary DC loop to be measured, achieving the relative measurement error of the sensor less than 1% and thus improving the measurement accuracy.

BRIEF DESCRIPTION OF DRAWINGS

In order to explain the technical solutions of the embodiments of the present invention more clearly, the drawings needed to be used in the description for the embodiments will be briefly introduced below. Obviously, the drawings in the following description are only for some embodiments of the present invention. For those of ordinary skill in the art, other drawings can be obtained based on these drawings without exerting any creative effort. There are:

FIG. 1 is a schematic flow chart of a method for optimization to non-contact micro intelligent sensing in secondary DC loop potential provided by an embodiment of the present invention.

DETAILED DESCRIPTION OF THE INVENTION

Figure 2:
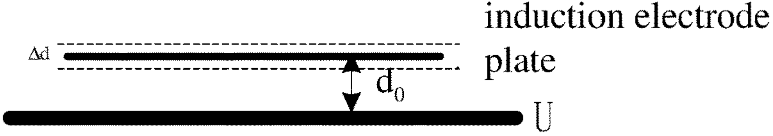
FIG. 2 is a schematic diagram of a vibration capacitive measurement device of a method for optimization to non-contact micro intelligent sensing in secondary DC loop potential provided by an embodiment of the present invention.
Figure 3:
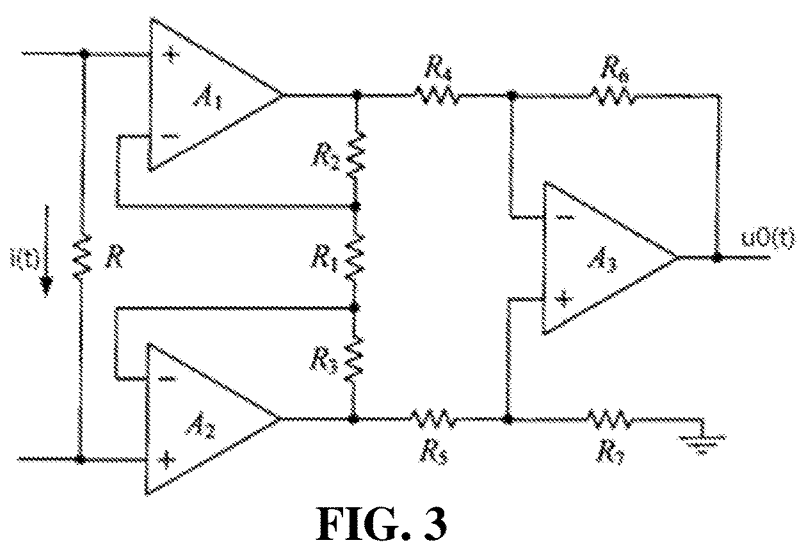
FIG. 3 is a schematic diagram of a three-op-amp differential amplifier of a method for optimization to non-contact micro intelligent sensing in secondary DC loop potential provided by an embodiment of the present invention.
Figure 4:
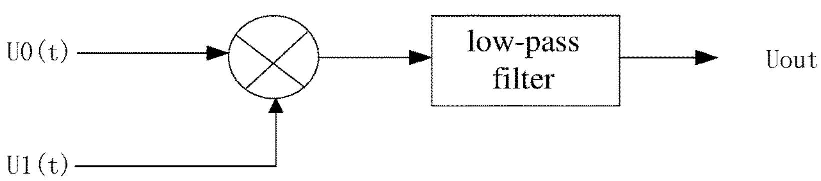
FIG. 4 is a schematic diagram of a phase-sensitive detection principle for a method for optimization to non-contact micro intelligent sensing in secondary DC loop potential provided by an embodiment of the present invention.

In order to make the above objects, features and advantages of the present invention more obvious and easy to understand, the specific embodiments of the present invention are described in detail below in conjunction with the accompanying drawings. It is obvious that the described embodiments are part of the embodiments of the present invention, not all of them. Example. Based on the embodiments of the present invention, all other embodiments obtained by ordinary people in the art without creative efforts should fall within the protection scope of the present invention.

Many specific details are set forth in the following description to fully understand the present invention. However, the present invention can also be implemented in other ways different from those described herein. Those skilled in the art can make similar generalizations without violating the significance of the present invention. Therefore, the present invention is not limited by the specific embodiments disclosed below.

Embodiment 1

Referring to FIG. 1 to FIG. 6, which illustrates a first embodiment of the present embodiment, a method for optimization to non-contact micro intelligent sensing in secondary DC loop potential is provided, including:

S1: demodulating a weak AC current modulation signal through a demodulation circuit, and amplifying the weak AC current modulation signal by a three-op-amp differential amplifier to output a stable and amplified measurable potential signal, passing the potential signal through a phase-sensitive detector to eliminate noise signals at non-driving frequencies, in which the noise-removed potential signal is filtered out by a low-pass filter to filter out the AC signal to obtain a stable DC potential signal.

The demodulating a weak AC current modulation signal through a demodulation circuit includes: installing a smart sensor on the secondary DC loop to be measured, in which, based on the modulation principle of a vibration capacitor, the capacitance of the induction electrode plate and the charged object under testing generates an alternating capacitance driven by the Lorentz force driver, causing charges on the induction electrode plate with periodically changing so as to collect the AC current signal i(t) on the induction electrode plate.

Through the three-op-amp differential amplifier, the AC current signal is turned into an amplified AC potential signal, and the AC potential signal $u_0(t)$ is obtained.

After the AC potential signal passes through data processing by the phase-sensitive detector and the low-pass filter, a real-time potential signal $u_0$ of the secondary DC loop to be measured is output.

By correcting the air-relative dielectric coefficient that affects capacitance measurement, the effects of temperature, humidity, and air pressure to the measurement signal are resolved, and the corrected DC potential signal $u_1$ is obtained.

According to the output potential $u_1$ of the smart sensor in the potential measurement scenario, in combination with a fitting formula $u_2=ku_1$ to calibrate the actual output potential of the smart sensor, the output potential of the measurement unit of the smart sensor after potential calibration is the secondary DC loop potential to be measured.

The demodulating the weak AC current modulation signal includes: based on the modulation principle of the vibration capacitor, the back-end electrical signal detection circuit is used to amplify the electrical signal to produce a potential signal output, and the distance between the induction electrode plate and the secondary DC loop to be measured is:

$$d = d_0 + \Delta d \sin(\omega t)$$

where, $d_0$ is the distance between the vibrating plate and the secondary DC loop to be measured when it is in the equilibrium position, Δd is the vibration amplitude of the induction electrode plate, when the driving structure based on Lorentz force is selected, $d_0$ and Δd can be obtained by measurement, and ω is the angular frequency of vibration, ω=2πf, f is the frequency of AC current passed into the vibrating cantilever beam of the driving structure, and t is time.

Then, the capacitance on the vibrating plate is:

$$C = \frac{\varepsilon S}{d_0 + \Delta d \sin(\omega t)}$$

where, ε is the dielectric coefficient of air, and S is the area of the vibrating plate.

Then the induced current on the induction electrode plate is:

$$i(t) = -U\varepsilon S \times \frac{d\omega \cos(\omega t)}{[d_0 + d \sin(\omega t)]^2}$$

where U is the potential difference between the induction electrode plate and the surface of the secondary DC loop to be measured.

The demodulating includes that the AC current signal output by the vibration capacitor of a modulation circuit needs to be converted into an output potential through an operational amplifier.

The output potential is:

$$u_0(t) = -i(t) \times R \times \left(1 + \frac{2R_2}{R_1}\right) \times \frac{R_6}{R_4}$$

where, i(t) is the input AC current, R is the input resistance, and $R_1$, $R_2$, $R_4$, $R_6$ are the feedback resistances. The input resistance R is set as 10 MΩ. A1, A2, and A3 form a three-op-amp differential amplifier, in which A1, A2, and A3 are operational amplifiers. Op-amps A1 and A2 constitute the first-level operational amplifier, which is mainly used to improve the input impedance of the entire amplifier circuit. The operational amplifier A3 constitutes the second-level operational amplifier. Differential circuit is used to improve the common mode rejection ratio operation.

The demodulating further includes marking the measured signal $u_0$ (t) and the reference signal $u_1$ (t) as:

$$u_0(t) = U_0 \sin(\omega t + \phi)$$

$$u_1(t) = U_1 \sin(\omega t + \delta)$$

where, $U_0$ and $U_1$ are the amplitudes of the measured signal and the reference signal, respectively, ϕ and δ are the phases of the measured signal and the reference signal, respectively, ω is the angular frequency, and the reference signal $u_1$ (t) adopts the driving power of the micro-Lorentz force driver.

After the measured signal and the reference signal are input into the multiplier simultaneously and multiplied, the demodulated output response signal is:

$$u_{out} = \frac{1}{2}U_0U_1\cos(\phi - \delta) - \frac{1}{2}U_0U_1\cos(2\omega t + \phi + \delta) + U_1\sin(\omega t + \delta)$$

where, $U_0$ and $U_1$ are the amplitudes of the measured signal and the reference signal, respectively, ϕ and δ are the phases of the measured signal and the reference signal, respectively, ω is the angular frequency.

The demodulated output response signal is then filtered by the low-pass filter, and the high-frequency AC signal in the formula is removed; and accordingly, the final potential output by the signal demodulation circuit is:

$$u_{out} = \frac{1}{2}U_0U_1\cos(\phi - \delta)$$

where, the meaning of each physical symbol is the same as the definition of the previous formula.

S2: inputting the DC potential signal to a comprehensive computing module for analysis and processing to obtain potential of a measured object;

S3: using micro temperature, humidity, and air pressure sensors to measure environmental temperature, humidity, and air pressure information, in which the information is input to the comprehensive computing module to analyze and correct measurement potential results, and the measurement results are output to a communication module for external output, which supports both analog and digital output methods.

The analysis by the comprehensive computing module includes: establishing a relationship among air dielectric coefficient, air temperature, humidity, and atmospheric pressure, as shown below:

$$\varepsilon_r = \frac{\frac{2PK}{R_g(273+t)}\left[1 - \frac{R_g\delta p_s}{P}\left(\frac{1}{R_g} - \frac{1}{R_s}\right)\right] + 1}{1 - \frac{PK}{R_g(273+t)}\left[1 - \frac{R_g\delta p_s}{P}\left(\frac{1}{R_g} - \frac{1}{R_s}\right)\right]}$$

In the formula, P is the atmospheric pressure, δ is the relative humidity of the air, t is the temperature in degrees Celsius, δ and t are measured by a micro temperature and humidity sensor, P is measured by a micro air pressure sensor, K is the proportionality constant, $R_g$ is the dry air gas constant, $R_s$ is the water vapor gas constant, $p_s$ is the saturated water vapor pressure corresponding to the ambient temperature.

The corrected output potential is:

$$u_1 = u_{out} \times \frac{\frac{2PK}{R_g(273+t)}\left[1 - \frac{R_g\delta p_s}{P}\left(\frac{1}{R_g} - \frac{1}{R_s}\right)\right] + 1}{1 - \frac{PK}{R_g(273+t)}\left[1 - \frac{R_g\delta p_s}{P}\left(\frac{1}{R_g} - \frac{1}{R_s}\right)\right]}$$

where, $u_{out}$ is the output potential after passing through the A/D converter, P is the atmospheric pressure, δ is the relative humidity of the air, t is the temperature in degrees Celsius, K is the proportionality constant, $R_g$ is the dry air gas constant, $R_s$ is the water vapor gas constant, $p_s$ is the saturated water vapor pressure corresponding to the ambient temperature.

The measurement potential results include that the unit area weight of the sandwich structure of the measuring device shell material is:

$$W = \rho_1 d_1 + \rho_2 d_2 + \rho_3 d_3$$

In the formula, $\rho_1$, $\rho_2$, $\rho_3$ are the material densities of the inner panel, sandwich layer, and outer panel, respectively, and $d_1$, $d_2$, $d_3$ are the thicknesses of the inner panel, sandwich layer, and outer panel, respectively.

The calculation formula for the electromagnetic shielding effectiveness of the measuring device shell material is:

$$SE = 20lg\left(1 + \frac{1}{2}\sqrt{\frac{\mu_0}{\varepsilon_0}} \times \sigma \times c\right)$$

In the formula, $\mu_0$ is the vacuum magnetic permeability, $\varepsilon_0$ is the vacuum conductivity, σ is the volume conductivity of the material, $d_1$, $d_2$, $d_3$ are the thicknesses of the inner panel, sandwich layer, and outer panel, respectively, and c is the thickness of the material as $c=d_1+d_2+d_3$.

The Lagrangian multiplier method is used to construct a Lagrangian function with the thicknesses of the inner panel, the core layer, and the outer panel as variables, seeking to minimize the shell weight W of the measurement device under constraints with strength, stiffness, and electromagnetic shielding effectiveness, in which the Lagrangian function is formulated as follows:

$$L(d_1, d_2, d_3, \lambda_1, \lambda_2, \lambda_3) = \rho_1 d_1 + \rho_2 d_2 + \rho_3 d_3 - \lambda_1\left[\frac{1}{4}(E_{f1} d_1 + E_{f3} d_3) \times d_2^2 - D_1\right] - \lambda_2\left[\frac{1}{4}(G_{f1} d_1 + G_{f3} d_3) \times d_2^2 - K_1\right] - \lambda_3\left[20lg\left(1 + \frac{1}{2}\sqrt{\frac{\mu_0}{\varepsilon_0}} \times \sigma \times d\right) - SE_1\right]$$

where, $\lambda_1$, $\lambda_2$, $\lambda_3$ are the Lagrange multipliers, $E_{f1}$ and $E_{f3}$ are the elastic modulus parameters of the inner panel and outer panel material, $G_{f1}$ and $G_{f1}$ are the shear modulus parameters, $D_1$ is the initial parameter of the shell bending stiffness, $K_1$ is the initial parameter of the shell torsional stiffness, $SE_1$ is the minimum material electromagnetic shielding effectiveness, which is taken at 58 dB.

By the formula, it is solved to obtain that the thickness of the inner panel is 0.08 mm, the thickness of the interlayer is 1 mm, the thickness of the outer panel is 0.5 mm. The length, width, and height of the shell of measuring device are 3 cm, 3 cm, and 4 cm, respectively. The minimum weight of the shell of the measuring device is 9.9 g, and the maximum electromagnetic shielding effect is 63 dB. It complies with the requirements of miniaturization, lightweight, and strong anti-electromagnetic interference capabilities for the measuring device.

S4: packaging an induction electrode plate, a micro Lorentz force driver, a three-op-amp differential amplifier, a phase-sensitive detector, and a low-pass filter to form a potential collection "probe", and packaging a comprehensive computing module, micro temperature and humidity, air pressure sensors, and a communication module to form a potential measurement "unit", in which the potential measurement "unit" supports access of the multiple potential acquisition "probes".

Embodiment 2

Referring to FIG. 2, which illustrates a second embodiment of the present invention, the embodiment provides a system for optimization to non-contact micro intelligent sensing in secondary DC loop potential, including an instruction collection unit, a system logic unit, a data processing unit, a data storage unit, and a data main-console; the instruction collection unit is used for collecting instructions issued by the system; the system logic unit is used for carrying system calibration rules and system control logic; the data processing unit is used for processing data in instructions or system programs; the data storage unit is used to store instructions and operations in the collection, calculation and driving stages; the data main-console is used to track the entire process of program control.

Embodiment 3

A third embodiment of the present invention is provided and is different than the previous two embodiments with the features:

If the functions are implemented in the form of software functional units and sold or used as independent products, they can be stored in a computer-readable storage medium. Based on this understanding, the technical solution of the present invention essentially or the part that contributes to the existing technology or the part of the technical solution can be embodied in the form of a software product. The computer software product is stored in a storage medium, including several instructions configured to cause a computer device (which may be a personal computer, a server, or a network device, etc.) to execute all or part of the steps of the methods described in various embodiments of the present invention. The aforementioned storage media include: USB flash drive, mobile hard disk, ROM (Read-Only Memory), RAM (Random Access Memory), magnetic disk, or optical disk, which serves as media that can store program code.

It should be noted that the above embodiments are provided for the purpose of illustrating the technical solution of the present invention and should not be considered as limiting. Although reference has been made to preferred embodiments for a detailed description of the present invention, those skilled in the art should understand that modifications or equivalent replacements can be made to the technical solution of the present invention without departing from the spirit and scope of the invention, all of which are encompassed within the scope of the claims of the present invention.

Those skilled in the art will understand that embodiments of the present disclosure may be provided as methods, systems, or computer program products. Accordingly, the present disclosure may take the form of an entirely hardware embodiment, an entirely software embodiment, or an embodiment that combines software and hardware aspects. Furthermore, the present disclosure may take the form of a computer program product embodied on one or more computer-usable storage media (including, but not limited to, disk storage, CD-ROM, optical storage, etc.) having computer-usable program code embodied therein. The solutions in the embodiments of the present disclosure can be implemented using various computer languages, such as the object-oriented programming language Java and the literal scripting language JavaScript.

The present disclosure is described with reference to flowchart illustrations and/or block diagrams of methods, apparatus (systems), and computer program products according to embodiments of the present disclosure. It will be understood that each process and/or block in the flowchart illustrations and/or block diagrams, and combinations of processes and/or blocks in the flowchart illustrations and/or block diagrams, can be implemented by computer program instructions. These computer program instructions may be provided to a processor of a general-purpose computer, special-purpose computer, embedded processor, or other programmable data processing device to produce a machine, such that instructions executed by a processor of a computer or other programmable data processing device produce means for implementing the functions specified in the flow diagram process or processes and/or the block diagram block or blocks.

These computer program instructions can also be stored in computer-readable memory capable of booting a computer or another programmable data processing device to operate in a specific manner, such that the instructions stored in the computer-readable memory result in the creation of a manufactured product comprising an instruction device. This instruction device implements the functionality specified in one or more processes and/or boxes in a flowchart or one or more boxes in a block diagram.

Although the preferred embodiments of the present disclosure have been described, those skilled in the art will be able to make additional changes and modifications to these embodiments once the basic inventive concepts are apparent. Therefore, it is intended that the appended claims be construed to include the preferred embodiments and all changes and modifications that fall within the scope of this application.

Obviously, those skilled in the art can make various changes and modifications to the present disclosure without departing from the spirit and scope of the present application. In this way, if these modifications and variations of the present application fall within the scope of the claims of the present disclosure and equivalent technologies, the present disclosure is also intended to include these modifications and variations.

Embodiment 4

Figure 5:
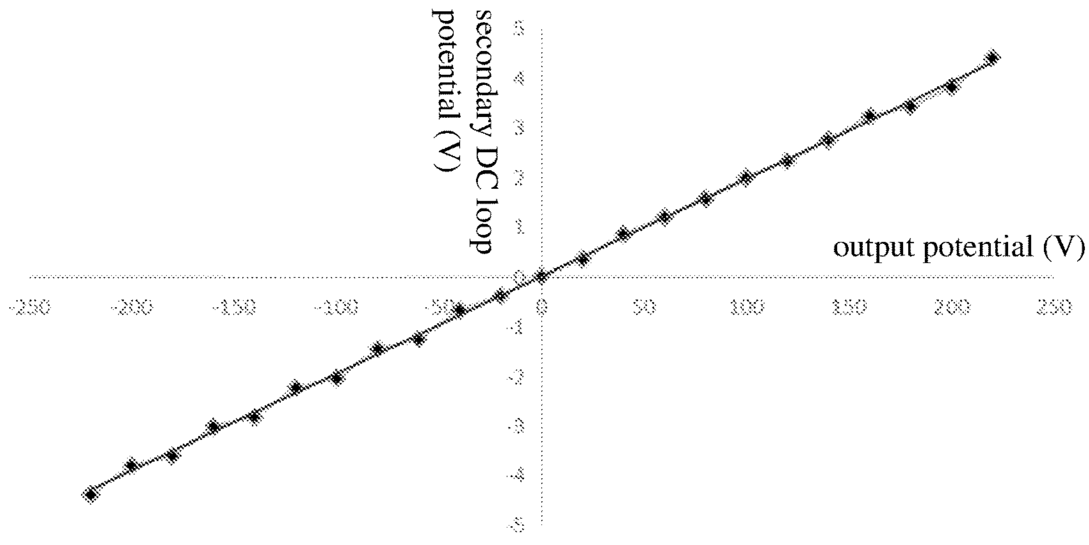
FIG. 5 is a schematic diagram of a test data fitting curve for a method for optimization to non-contact micro intelligent sensing in secondary DC loop potential provided by an embodiment of the present invention.

Referring to FIG. 5, via experiments, the present invention fixes the smart sensor probe to the secondary DC loop to be measured and changes the potential of the secondary DC loop. The potential change range is −220V to 220V. At the same time, the output potential of the potential measurement unit of the smart sensor is recorded. During the test process, five tests are performed on each measurement point, and the average of the five data is taken. The test results are shown in Table 1:

TABLE 1 test data for intelligent sensor linearity

| Secondary DC loop potential (V) | Smart sensor output potential (V) |
|---|---|
| −220 | −4.396 |
| −200 | −3.806 |
| −180 | −3.616 |
| −160 | −3.025 |
| −140 | −2.833 |
| −120 | −2.242 |
| −100 | −2.05 |
| −80 | −1.463 |
| −60 | −1.27 |
| −40 | −0.681 |
| −20 | −0.39 |
| 0 | 0 |
| 20 | 0.337 |
| 40 | 0.838 |
| 60 | 1.179 |
| 80 | 1.549 |
| 100 | 1.979 |
| 120 | 2.312 |
| 140 | 2.739 |
| 160 | 3.221 |
| 180 | 3.41 |
| 200 | 3.808 |
| 220 | 4.395 |

From the analysis of test data, it can be seen that the output potential of the smart sensor is proportional to the potential of the secondary DC loop. It can be fitted by the least squares method, and the fitting curve is shown in FIG. 5.

The fitting curve expression of the test results is $u_2=ku_1$, where $u_1$ is the output potential of the smart sensor, $u_2$ is the secondary DC loop potential, k is the voltage proportional coefficient, and k is taken as 51.2.

By the linearity test of the smart sensor and using the linear fitting results of the test data to calibrate the output potential, the final output potential of the smart sensor is the secondary DC loop potential to be measured, which improves the measurement accuracy.

Embodiment 5

Figure 6:
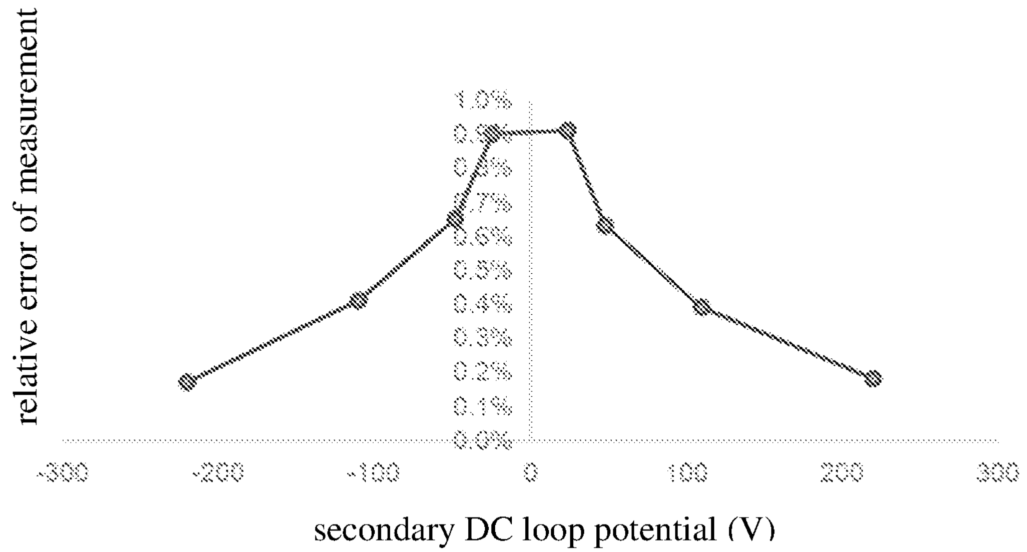
FIG. 6 is a schematic diagram of a relative error in smart sensor measurement for a method for optimization to non-contact micro intelligent sensing in secondary DC loop potential provided by an embodiment of the present invention.

Referring to FIG. 6, the secondary DC loop of the substation that is not in operation is selected, and an intelligent sensor is installed in the secondary DC loop; usually, the secondary DC loop potential is selected as ±24V, ±48V, ±110V, ±220V, respectively, and the measured values of the smart sensor are recorded.

The measurement results are analyzed and compared, and the relative error of the measurement is calculated. The relative error calculation formula is:

$$re\ \% = \left|\frac{u_c - u_2}{u_2}\right| \times 100\%,$$

where $u_c$ is the measurement value of the smart sensor, and $u_2$ is the actual potential value of the DC secondary loop to be measured.

TABLE 2 measurement data of the secondary DC loop under testing

| Secondary DC loop potential (V) | Measured value (V) | Relative error of measurement |
|---|---|---|
| −220 | −220.374 | 0.17% |
| −110 | 109.549 | 0.41% |
| −48 | −47.688 | 0.65% |
| −24 | −23.784 | 0.90% |
| 24 | 23.782 | 0.91% |
| 48 | 47.698 | 0.63% |
| 110 | 110.429 | 0.39% |
| 220 | 219.604 | 0.18% |

After analyzing and processing the test data, the measurement unit of the smart sensor after potential calibration can accurately measure the secondary DC loop potential, and the error of the measurement data is less than 1%. Therefore, the non-contact micro intelligent sensor for secondary DC loop potential measures the potential of the secondary DC loop with very high measurement accuracy.

It should be noted that the above embodiments are provided for the purpose of illustrating the technical solution of the present invention and should not be considered as limiting. Although reference has been made to preferred embodiments for a detailed description of the present invention, those skilled in the art should understand that modifications or equivalent replacements can be made to the technical solution of the present invention without departing from the spirit and scope of the invention, all of which are encompassed within the scope of the claims of the present invention.

What is claimed is:

1. A method for optimization to non-contact micro intelligent sensing in secondary direct current (DC) loop potential, comprising:

demodulating an alternating current (AC) current modulation signal through a demodulation circuit, amplifying the AC current modulation signal by a three-op-amp differential amplifier to output a stable and amplified measurable potential signal, and passing the potential signal through a phase-sensitive detector to eliminate noise signals at non-driving frequencies, wherein the noise-removed potential signal is filtered out by a low-pass filter to filter out the AC signal to obtain a stable DC potential signal;

inputting the DC potential signal to a comprehensive computing module for analysis and processing to obtain potential of a measured object;

using a temperature sensor, a humidity sensor, and an air pressure sensor to measure environmental temperature, humidity, and air pressure information, wherein the information is input to the comprehensive computing module to analyze and correct measurement potential results, and the measurement potential results are output to a communication module for external output, which supports both analog and digital output methods;

packaging an induction electrode plate, a micro Lorentz force driver, the three-op-amp differential amplifier, the phase-sensitive detector, and the low-pass filter to form a potential collection probe, and packaging the comprehensive computing module, the the temperature sensor, the humidity sensor, and the air pressure sensor, and the communication module to form a potential measurement unit, wherein the potential measurement unit supports access of the potential collection probe.

2. The method for optimization to non-contact micro intelligent sensing in secondary DC loop potential according to claim 1, wherein the demodulating the AC current modulation signal comprises: installing a smart sensor on the secondary DC loop to be measured, wherein, based on modulation principle of a vibration capacitor, capacitance of the induction electrode plate and a charged object under testing generates an alternating capacitance driven by the Lorentz force driver, causing charges on the induction electrode plate with periodically changing so as to collect an AC current signal i(t) on the induction electrode plate, wherein through the three-op-amp differential amplifier, the AC current signal is turned into an amplified AC potential signal, and an AC potential signal $u_0(t)$ is obtained, wherein, after the AC potential signal passes through data processing by the phase-sensitive detector and the low-pass filter, a real-time potential signal $u_0$ of the secondary DC loop to be measured is output, wherein, by correcting an air-relative dielectric coefficient that affects capacitance measurement, effects of temperature, humidity, and air pressure to a measurement signal are resolved, and a corrected DC potential signal $u_1$ is obtained, wherein, according to the output potential $u_1$ of the smart sensor in a potential measurement scenario, in combination with a fitting formula $u_2=ku_1$ to calibrate an actual output potential of the smart sensor, an output potential of a measurement unit of the smart sensor after potential calibration is the secondary DC loop potential to be measured.

3. The method for optimization to non-contact micro intelligent sensing in secondary DC loop potential according to claim 2, wherein the demodulating the AC current modulation signal comprises: using a back-end electrical signal detection circuit, based on modulation principle of the vibration capacitor, to amplify an electrical signal to produce a potential signal output, wherein a distance between the induction electrode plate and the secondary DC loop to be measured is:

$$d = d_0 + \Delta d\sin(\omega t)$$

where, $d_0$ is a distance between a vibrating plate and the secondary DC loop to be measured when it is in an equilibrium position, Δd is vibration amplitude of the induction electrode plate, when a driving structure based on Lorentz force is selected, $d_0$ and Δd are obtained by measurement, and ω is an angular frequency of vibration, ω=2 πf, f is frequency of AC current passed into a vibrating cantilever beam of the driving structure, and t is time;

wherein capacitance on the vibrating plate is:

$$C = \frac{\varepsilon S}{d_0 + \Delta d\sin(\omega t)}$$

where, ε is a dielectric coefficient of air, and S is an area of the vibrating plate;

wherein an induced current on the induction electrode plate is:

$$i(t) = -U\varepsilon S \times \frac{d\omega\cos(\omega t)}{[d_0 + d\sin(\omega t)]^2}$$

where U is a potential difference between the induction electrode plate and a surface of the secondary DC loop to be measured.

4. The method for optimization to non-contact micro intelligent sensing in secondary DC loop potential according to claim 3, the demodulating comprises that the AC current signal output by the vibration capacitor of a modulation circuit needs to be converted into an output potential through an operational amplifier;

wherein the output potential is:

$$u_0(t) = -i(t) \times R \times \left(1 + \frac{2R_2}{R_1}\right) \times \frac{R_6}{R_4}$$

where, i(t) is an input AC current, R is an input resistance, and $R_1$, $R_2$, $R_4$, $R_6$ are feedback resistances, wherein an input resistance R is set as 10 MΩ.

5. The method for optimization to non-contact micro intelligent sensing in secondary DC loop potential according to claim 4, wherein the demodulating further comprises marking the measured signal $u_0(t)$ and a reference signal $u_1(t)$ as:

$$u_0(t) = U_0\sin(\omega t + \phi)$$

$$u_1(t) = U_1\sin(\omega t + \delta)$$

where, $U_0$ and $U_1$ are amplitudes of the measured signal and the reference signal, respectively, ϕ and δ are phases of the measured signal and the reference signal, respectively, ω is angular frequency, and the reference signal $u_1(t)$ adopts driving power of the micro-Lorentz force driver;

wherein, after the measured signal and the reference signal are input into a multiplier simultaneously and multiplied, a demodulated output response signal is:

$$u_{out} = \frac{1}{2}U_0U_1\cos(\phi - \delta) - 12U_0U_1\cos(2\omega t + \phi + \delta) + U_1\sin(\omega t + \delta)$$

where, $U_0$ and $U_1$ are the amplitudes of the measured signal and the reference signal, respectively, ϕ and δ are the phases of the measured signal and the reference signal, respectively, ω is the angular frequency;

wherein the demodulated output response signal is then filtered by the low-pass filter, and a high-frequency AC signal in the formula is removed; and accordingly, a final potential output by a signal demodulation circuit is:

$$u_{out} = \frac{1}{2}U_0U_1\cos(\phi - \delta).$$

6. The method for optimization to non-contact micro intelligent sensing in secondary DC loop potential according to claim 5, wherein the analysis by the comprehensive computing module comprises: establishing a relationship among air dielectric coefficient, air temperature, humidity, and atmospheric pressure, as:

$$\varepsilon_r = \frac{\frac{2PK}{R_g(273+t)}\left[1 - \frac{R_g\delta p_s}{P}\left(\frac{1}{R_g} - \frac{1}{R_s}\right)\right] + 1}{1 - \frac{PK}{R_g(273+t)}\left[1 - \frac{R_g\delta P_s}{P}\left(\frac{1}{R_g} - \frac{1}{R_s}\right)\right]}$$

wherein in the formula, P is atmospheric pressure, δ is relative humidity of the air, t is temperature in degrees Celsius, δ and t are measured by the temperature sensor and the humidity sensor, P is measured by the air pressure sensor, K is a proportionality constant, $R_g$ is a dry air gas constant, $R_s$ is a water vapor gas constant, $P_s$ is saturated water vapor pressure corresponding to ambient temperature;

wherein the corrected output potential is:

$$u_1 = u_{out} \times \frac{\frac{2PK}{R_g(273+t)}\left[1 - \frac{R_g\delta p_s}{P}\left(\frac{1}{R_g} - \frac{1}{R_s}\right)\right] + 1}{1 - \frac{PK}{R_g(273+t)}\left[1 - \frac{R_g\delta P_s}{P}\left(\frac{1}{R_g} - \frac{1}{R_s}\right)\right]}$$

where, $u_{out}$ is an output potential after passing through an A/D converter, P is the atmospheric pressure, δ is the relative humidity of the air, t is the temperature in degrees Celsius, K is the proportionality constant, $R_g$ is the dry air gas constant, $R_s$ is the water vapor gas constant, $P_s$ is the saturated water vapor pressure corresponding to the ambient temperature.

7. The method for optimization to non-contact micro intelligent sensing in secondary DC loop potential according to claim 6, wherein measurement potential results comprises that a unit area weight of a sandwich structure of a shell material of a measuring device is:

$$W = \rho_1 d_1 + \rho_2 d_2 + \rho_3 d_3$$

wherein, in the formula, $\rho_1$, $\rho_2$, $\rho_3$ are material densities of an inner panel, a sandwich layer, and an outer panel, respectively, and $d_1$, $d_2$, $d_3$ are thicknesses of the inner panel, the sandwich layer, and the outer panel, respectively;

wherein a calculation formula for electromagnetic shielding effectiveness of a shell material of a measuring device is:

$$SE = 20lg\left(1 + \frac{1}{2}\sqrt{\frac{\mu_0}{\varepsilon_0}} \times \sigma \times c\right)$$

wherein, in the formula, $u_0$ is vacuum magnetic permeability, $\varepsilon_0$ is vacuum conductivity, σ is volume conductivity of the material, $d_1$, $d_2$, $d_3$ are the thicknesses of the inner panel, the sandwich layer, and the outer panel, respectively, and c is a thickness of the material as $c=d_1+d_2+d_3$;

wherein a Lagrangian multiplier method is used to construct a Lagrangian function with the thicknesses of the inner panel, the core layer, and the outer panel as variables, seeking to minimize a shell weight W of the measurement device under constraints with strength, stiffness, and electromagnetic shielding effectiveness, in which the Lagrangian function is formulated as follows:

$$L(d_1, d_2, d_3, \lambda_1, \lambda_2, \lambda_3) = \rho_1 d_1 + \rho_2 d_2 + \rho_3 d_3 - \lambda_1\left[\frac{1}{4}(E_{f1}d_1 + E_{f3}d_3) \times d_2^2 - D_1\right] - \lambda_2\left[\frac{1}{4}(Gf_1 d_1 + Gf_3 d_3) \times d_2^2 - K_1\right] - \lambda_3\left[20lg\left(1 + \frac{1}{2}\sqrt{\frac{\mu_0}{\varepsilon_0}} \times \sigma \times d\right) - SE_1\right]$$

where, $\lambda_1$, $\lambda_2$, $\lambda_3$ are Lagrange multipliers, $Ef_1$ and $Ef_3$ are elastic modulus parameters of a material of the inner panel and outer panel, $Gf_1$ and $Gf_1$ are shear modulus parameters, D1 is an initial parameter of shell bending stiffness, $K_1$ is an initial parameter of shell torsional stiffness, $SE_1$ is minimum material electromagnetic shielding effectiveness, which is taken at 58 dB.

8. A computer device comprising a memory and a processor, wherein the memory stores a computer program, characterized in that when the processor executes the computer program, it implements steps of the method for optimization to non-contact micro intelligent sensing in secondary DC loop potential according to the method of claim 1.

9. A non-transitory computer readable storage media has a computer program stored thereon, characterized in that when the computer program is executed by a processor, steps of the method for optimization to non-contact micro intelligent sensing in secondary DC loop potential according to the method of claim 1 are implemented.

* * * * *